United States Patent [19]

Ciaffone

[11] 3,809,436

[45] May 7, 1974

[54] PROCESS FOR CONVEYANCE OF ASH

[75] Inventor: Charles P. Ciaffone, Sturbridge, Mass.

[73] Assignee: CPC Engineering Corporation, Sturbridge, Morocco

[22] Filed: May 25, 1972

[21] Appl. No.: 257,012

[52] U.S. Cl. .................. 302/20, 110/8 R, 259/151, 302/53
[51] Int. Cl. ............................................. B65g 53/12
[58] Field of Search............ 110/8 R; 302/20, 53–55, 302/14–16; 259/147, 151

[56] References Cited
UNITED STATES PATENTS

| | | | |
|---|---|---|---|
| 951,754 | 3/1910 | Buzzell et al. | 302/55 |
| 894,813 | 8/1908 | Buzzell et al. | 259/151 X |
| 3,463,460 | 8/1969 | Taylor et al. | 259/147 |
| 2,264,610 | 12/1941 | Beardsley | 259/147 |
| 866,804 | 9/1907 | Olson | 302/20 |
| 3,601,068 | 8/1971 | Ciaffone et al. | 110/8 R |

Primary Examiner—Richard E. Aegerter
Assistant Examiner—W. Scott Carson
Attorney, Agent, or Firm—Thomas B. Graham

[57] ABSTRACT

A process for conveying ash which comprises uniformly moistening said ash and thereafter subjecting said moistened ash to pneumatic pressure so as to convey it through a connecting pipe to a receiving means, and an apparatus directed thereto which comprises means for introducing the ash; a pneumatic ejector situated beneath the introducing means, which is a generally cylindrical vessel terminating in a conical bottom section, having an inlet valve suitable for closing off the inlet to make the vessel airtight, an air inlet for admitting compressed air to the ejector, the air inlet being connected by a monitored pressure air line to a source of compressed air, a manifold situated in said ejector and containing a plurality of spray nozzles for introducing water into the ejector, the manifold being connected to a monitored external water source, and a discharge gate also suitable for making the vessel airtight; and a discharge pipe leading from the bottom of the ejector to a receiving means.

1 Claim, 2 Drawing Figures

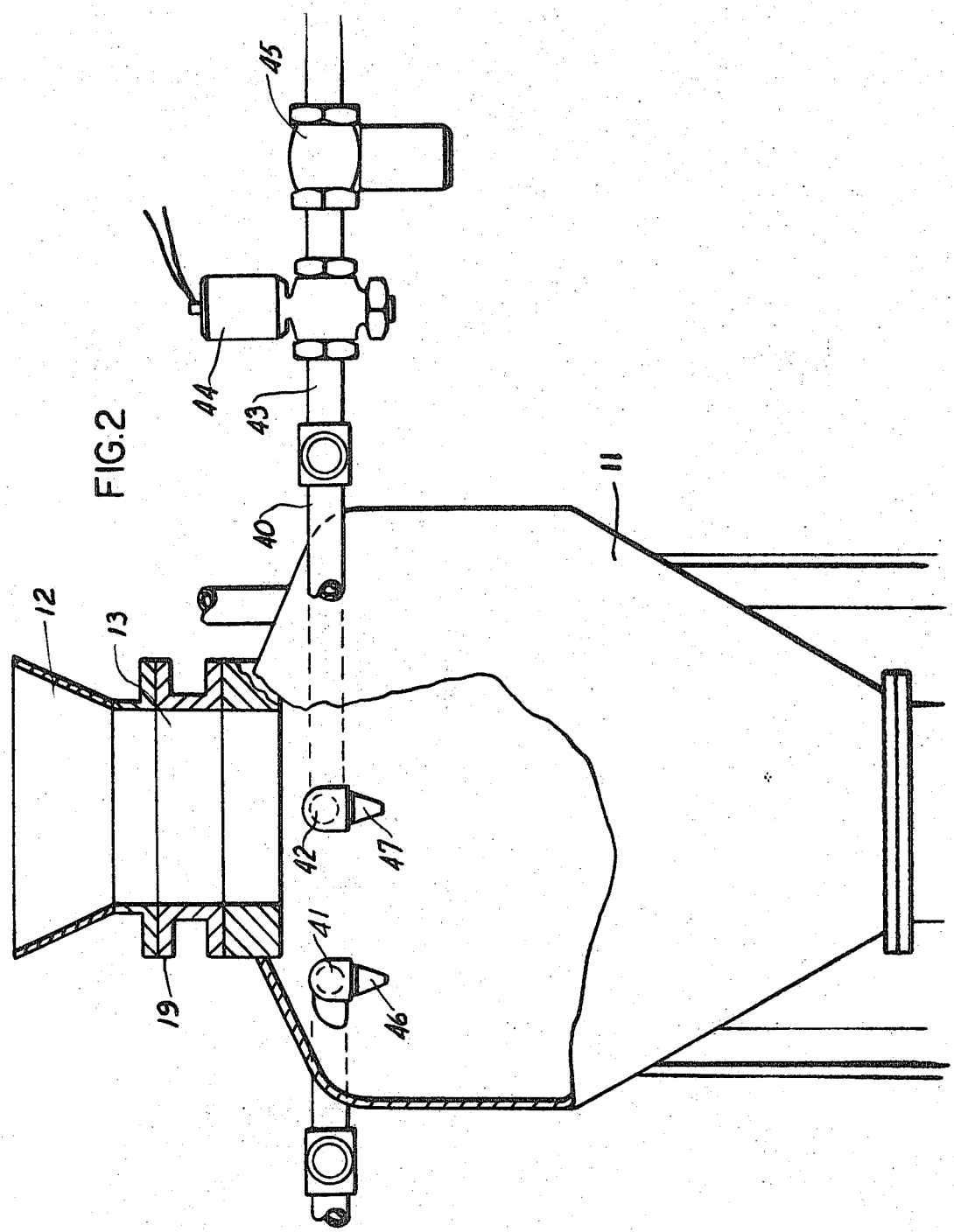

ence of Ash

PROCESS FOR CONVEYANCE OF ASH

BACKGROUND OF THE INVENTION

In a sewage treatment plant, various types of waste are encountered including coarse unground screenings, unwashed grit and organic matter, sludge and skimmings. The initial operation in separating and isolating this waste involves the screening out of coarse material which is referred to as "sewage screenings" as well as the collection of "grit," such as sand. The sludge component of the sewage is collected by sedimentation and filtration. It has been a recent development in the art to dispose of this collected waste by incineration as opposed to the outmoded approach of burying the waste. The resulting light sterile ash is collected at the base of the incinerator and utilized for various applications such, for example, as land fill.

However, the incineration of waste has raised numerous problems which relate to the handling, temporary storing and transporting of the resulting ash. Procedures adopted for such purposes have generally been cumbersome, time consuming and inefficient. In addition, few if any provisions have been made for transporting the ash in a closed system to avoid having the light ash discharged into the atmosphere and thereby causing air pollution and soot deposits.

The method which is presently being used for conveying the ash is particularly illustrative of the inefficiencies inherent in such handling and conveying methods. Dry ash must be fed by open bucket conveyors or screw conveyors to a conditioner, where the ash is moistened and mixed to the desired consistency. The resulting mixture, or slurry, is then deposited by gravity into trucks. Another method is to make a water/ash slurry and pump the ash to the disposal point.

SUMMARY OF THE INVENTION

It is the prime object of this invention to provide a process for conveying sewage ash.

It is a further object to provide an enclosed apparatus for conducting this process which will, simultaneously, significantly reduce the air pollution and dirt deposits of the conveying operation.

Other objects and advantages of this invention will be readily apparent from the following detailed description thereof.

I have now discovered that it is possible to use air pressure to rapidly and efficiently convey ash, such as sewage ash, from the incinerator to a receiving means. Thus, the basic approach is to uniformly moisten the ash and thereafter convey it by means of air pressure applied thereto. As a result, the practitioner is now able to eliminate cumbersome unsanitary conveying operations. He is also able to convey the ash over long distances and to elevate it to substantial heights.

In accordance with this process, a closed system has been constructed for use in conveying ash, this system providing efficient and sanitary conveying conditions. Thus, the use of a pneumatic ejector fitted with a water inlet in conjunction with a receiving means and a discharge pipe as a means for moistening and collecting the ash and subjecting it to air pressure so as to convey it to the receiving means provides for an efficient system which radically reduces the number of manual operations previously required. By keeping the line sealed in transferring the moistened ash to the receiving means, movement, transfer and discharge of the ash is accomplished. The closed system also allows the operation to be performed sanitarily without air pollution and soot deposits.

DESCRIPTION OF THE PREFERRED EMBODIMENT

Figure 1:
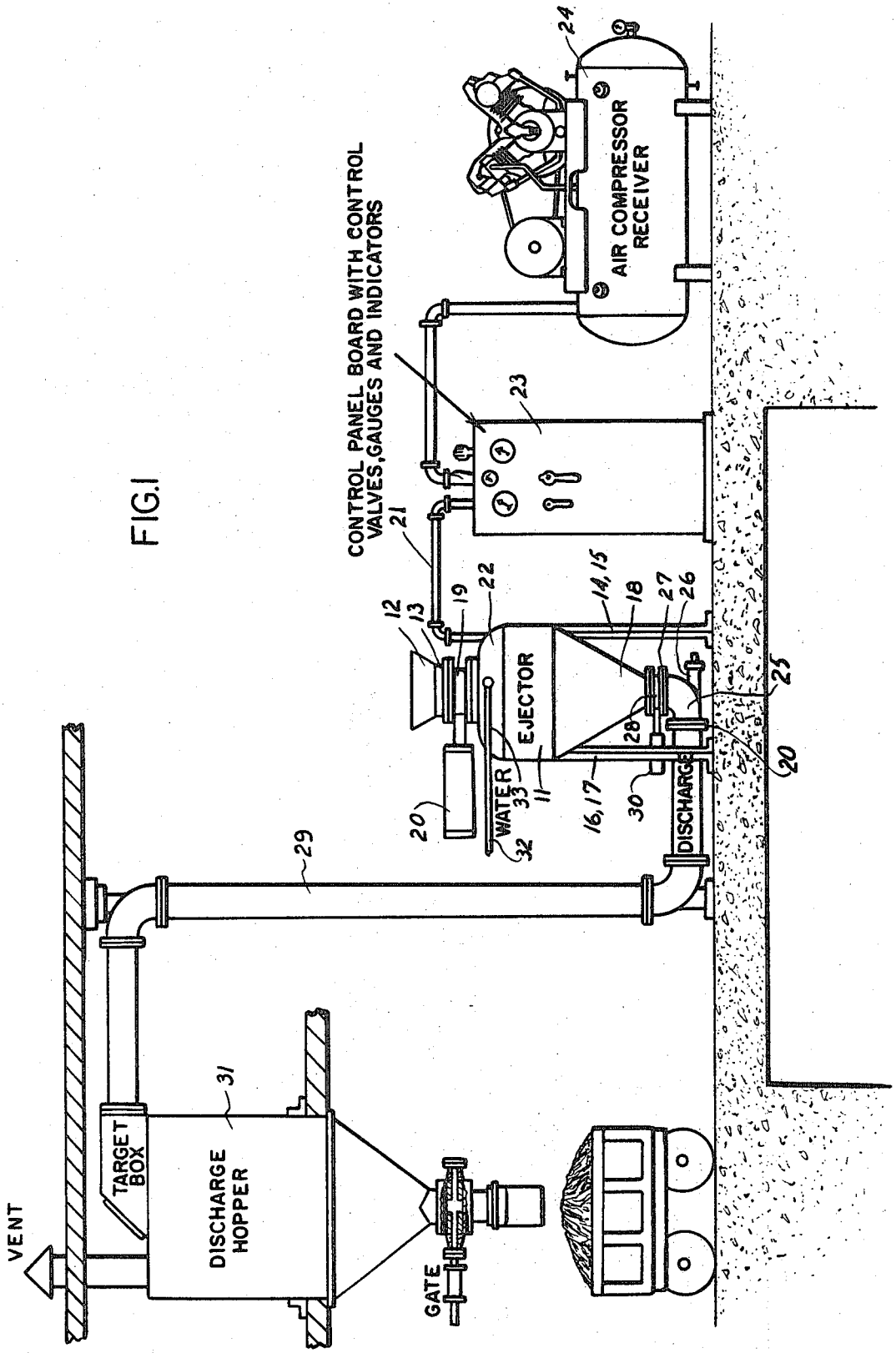

This invention will be better understood from the following detailed description thereof together with the accompanying drawings in which FIG. 1 is a front view of a typical apparatus of this invention depicting its several component parts and the relationship of these parts; and FIG. 2 is an enlarged cross-sectional view of a water inlet assembly which may be adapted to the apparatus of FIG. 1.

Referring now to FIG. 1, the apparatus of this invention depicted therein comprises a funnel 12 which leads directly into the inlet chute 13 of the pneumatic ejector 11. The pneumatic ejector 11 is supported by vertical legs 14, 15, 16, 17, four being a usual quota for a device of this size. The legs are integrally joined to a conical section 18 of the ejector. The top of the ejector 11 consists of an inlet chute 13 carrying an inlet valve 19. The inlet valve 19 serves to close off the inlet chute 13 and thereby make the vessel airtight. Among the applicable inlet valves are included knife gate valves and flap valves. The knife gate valve is preferred because on opening, a clear, straight channel is made available. It may be pneumatically, hydraulically, electrically, or mechanically operated by any suitable external arrangement indicated by the inlet chute valve housing 20.

A pressure air line 21 connects to air inlet 22 to supply compressed air to the system.

The pressure air line 21 is also connected to a control panel 23 which in turn is connected to a source of compressed air 24. The control panel 23 may be so designed as to either automatically or manually control the introduction of the compressed air into the ejector.

The bottom of the conical section 18 of the ejector 11 connects to an elbow 25 equipped with a cleanout plug 26, joining by mean of a flange 27 to a discharge gate valve 28 and, in turn to a discharge pipe 29.

The gate valve external housing is at 30 and virtually any external hardware suitable for opening and closing the gate valve may be used. As with the inlet valve, the knife gate valve is preferred because on opening, a clear straight channel is made available. The exact mechanism for opening or closing is a matter of designer's choice, pneumatic, hydraulic, electrical or manual mechanisms being available.

The discharge pipe 29 may be of any suitable length. It leads to the receiving means 31, such as a hopper wherein the wet ash is retained before being fed to a dump truck, railroad car, or other means for conveying the ash to its application site. The receiving means 31 shall be of adequate pressure to withstand full ejector pressure. The receiving means 31 may also be fitted with an air separator and vent in order to prevent solids from being discharged into the atmosphere. The pipe 29 is generally characterized by a shape which extends horizontally from the bottom of the ejector, rises to the level of the receiving means and then proceeds horizontally to run into the receiving means. In this manner, the most efficient conveyance of the waste material is achieved. Thus, when the wet ash is compacted in the ejector and the first horizontal section as well as when it passes through the vertical section it is necessarily present in a compact, tightly knit unit which can be acted upon by the full force of the pressurized air and thereby lifted to the requisite height. In contrast, when the ash is dispersed through greater areas of the discharge pipe, the air is diffused among the separated particles and a concurrent diminution in the applied air pressure conveying the total charge is experienced.

The water addition assembly is indicated by water line 32 connecting to manifold 33. This assembly is depicted in greater detail in FIG. 2, and comprises a collar or manifold 40 of a plurality of orifices 41, 42 which is situated in ejector 11 immediately beneath the inlet chute 13. The water supply line 43 leading to the manifold 40 is provided with a water control valve 44 an in-line filter 45 to insure adequate and continued water flow. The orifices 41, 42 are fitted with spray nozzles 46, 47. Spray nozzles 46, 47 are utilized in order to provided a homogeneous and controllable mist of water which will insure uniform moistening of the ash as it enters the ejector 11. Although the primary nozzles will be directed toward the center of the ejector 11 to uniformly contact the ash, other nozzles may be direct at the side of the ejector 11 to insure total wetting.

The ash resulting from incineration will generally exhibit a bulk density ranging from about 30 to 40 pounds/cubic foot. In order to achieve satisfactory ejection without having an ash product which is either too wet or too dry, it is desirable to moisten the ash with from about 20 to 90 percent, by weight, of water. As previously indicated, uniform moistening is essential for the novel process of this invention.

The process of this invention thus involves passing the ash from the incinerator through an introducing means such as a funnel into the inlet chute of the ejector with the inlet valve open and the discharge valve in a closed position. Simultaneously with the introduction of the ash, it is uniformly moistened by being contacted with the water spray eminating from the spray nozzles in the manifold. Moistening is continued till the desired moisture level is reached. When the moistened ash is compacted in the conical section of the ejector, the inlet valve is closed and air under pressure is forced into the ejector through the air inlet. The pressure within the vessel is allowed to build up to an appropriate level so as to overcome the force represented by the mass of the ash material whereupon this compacted mass is blown out through the discharge pipe to be deposited into the receiving means. Based upon the pressure of air applied, the ash can be lifted and delivered over any reasonable distance to the receiving means; heights of up to about 100 feet and distances of up to 2,000 feet being practical for purposes of this invention. The ash may be retained in the receiving means (hopper, bin, etc.) for an indefinite period of time or may be immediately transferred to dump truck and the like for shipment to the application site.

Actual experience in the handling of the ash at any particular plant will indicate the precise process variables to be utilized such as the volume of ash fed to the ejector, the pressure required to adequately eject the ash and the amount of water used, and the sizes and dimensions of the discharge pipe, elbows and other hardware. In general, the operational ejector ranges in size from about 1 to 500 cubic feet, while the pressure utilized to eject the ash may range from about 5 to 100 pounds per square inch, and preferably from about 30 to 60 pounds per square inch. It is to be noted that at the preferred pressures, the discharge is not only quicker, more complete (at least 90 percent discharge) and more powerful but, in addition, the wet ash will be discharged in a continuous slug. At lower pressures, the discharge is more intermittent thereby dissipating part of the applied air pressure. Furthermore, operating techniques which utilize fixed pressure settings provide excellent discharge and conveyance. On the other hand, techniques which utilize pressures that are gradually increased from zero prove less effective due to the small amount of discharge which occurs at the lower pressures. Even in the latter instance, however, the discharge pipe is rarely clogged and the ash is eventually conveyed to the collecting hopper.

Variations may, of course, be made in the above described apparatus of the invention. For example, a greater continuity of operation may be achieved by connecting two or more ejectors in parallel to the discharge pipe. Furthermore, a large ejector may be situated above a smaller ejector, thereby functioning as a storage, feed and/or preliminary moistening unit. Where the inlet gate is air operated, its housing and air valve may be connected to the air pressure line, thereby eliminating the need for a separate air system.

Likewise, the manifold may be connected to a dual water-air system such that upon cessation of the water addition, air may be introduced into the ejector and directed at the ejector walls to remove the wet ash which may have adhered thereto. In this manner, improved compacting of the ash is achieved, resulting in efficient conveyance and minimal loss of air pressure.

There may also be variations in the procedure utilized for moistening the ash. Thus, the ash may be premoistened and then charged into the ejector. Dry ash may be introduced into the ejector and then the appropriate amount of water added thereto with agitation. Likewise, the desired amount of water may be charged into the ejector and the dry ash admixed therewith. It is to be noted that each of these procedures is inferior to the simultaneous addition — spray mixing technique due to the difficulty in achieving total and uniform moistening therewith.

By way of specific illustration of the process of this invention utilizing the specified apparatus, a 1 cubic foot barrel of ash was passed, by means of an inlet chute, into a four cubic foot pneumatic ejector. Simultaneously therewith, the ash was moistened with a water spray eminating from a water inlet manifold positioned in the ejector and containing 2 × ¼ inches outlets fitted with spray nozzles, the nozzles being positioned 180° apart. The resulting moistened ash contained 64 percent, by weight, of water. Thereafter, the ejector inlet valve was closed and the air inlet opened to allow the compressed air to enter the ejector. An air pressure of approximately 17 pounds per square inch was required in order to overcome the force represented by the mass of ash, whereupon the compacted mass was quickly and efficiently ejected into a 6 inch diameter discharge pipe having approximately a 25 foot horizontal run and a 20 foot vertical rise and conveyed into the receiving hopper.

It was noted that this operation was conducted quickly and efficiently with only a negligible amount of ash being discharged into the atmosphere.

The above described procedure was then repeated utilizing the process variables noted in the following table:

| Volume of Ash (cu.ft) | %, by weight, moisture of ash | Pressure (psi) | Observations |
|---|---|---|---|
| 1.00 | 80 | 20 | good ejection 90% |
| 1.25 | 76 | 20 | good ejection 90% |
| 1.20 | 52 | 40 | fair ejection 20% residue in pot |
| 1.60 | 80 | 40 | excellent ejection to most of residue from last shot 98% |
| 1.60 | 90 | 40 | good ejection 90% |
| .50 | 20 | 10 | good ejection 90% |
| 1.00 | 25 | 25 | good ejection 85% |

The results summarized above further indicate the quick and efficient operation of the novel process of this invention.

In recapitulation, normally a rotary ash conditioner receives dry ash, which is then sprayed with water and mixed to a desired consistency by the action of the conditioner drum rotating about stationary scraper blades. The conditioned ash is then removed from the conditioner by gravity.

The ash conditioner-ejector conditions the ash as it enters the machine by means of fog nozzles, and further mixes and conditions the ash pneumatically as it travels out of the ejector and down the pipeline. Any mechanical equipment such as bucket or screw conveyors used to transfer the ash from the conditioner to the disposal point are eliminated.

While the ivention has been described in terms of the specific embodiments herein, it should be apparent that variations thereof may be developed without departing from the spirit or scope of the invention.

What is claimed is:

1. A system for the conveyance of sewage ash which comprises (1) a supported introducing means with an opening therein situated directly above, (2) the inlet chute of a pneumatic ejector terminating in a conical section, said vessel having closure valves for closing the top and bottom thereof, an air inlet adjacent to said inlet chute for introducing air under pressure into said vessel, said air inlet being connected to a source of said pressurized air through means for controlling the introduction of said air, and in said vessel comprising a manifold containing a plurality of orifices fitted with spray nozzles, said manifold being situated in said vessel immediately beneath said inlet chute and being connected to an external source of water through means or controlling the introduction of said water, (3) a discharge pipe connected to the bottom of the conical section of said vessel, and (4) a receiving means situated at the end of said discharge pipe; the introduction of the pressurized air into said vessel being such that the contents of the vessel are forcibly ejected under pneumatic pressure into the discharge pipe and conveyed to said receiving means.

* * * * *

UNITED STATES PATENT OFFICE
CERTIFICATE OF CORRECTION

Patent No. 3,809,436          Dated May 7, 1974

Inventor(s) Charles P. Ciaffone

It is certified that error appears in the above-identified patent and that said Letters Patent are hereby corrected as shown below:

In the Title Page, "[73] Assignee: CPC Engineering Corporation, Sturbridge, Morocco" should read:

- - [73] Assignee: CPC Engineering Corporation, Sturbridge, Massachusetts - -

Signed and sealed this 10th day of September 1974.

(SEAL)
Attest:

McCOY M. GIBSON, JR.
Attesting Officer

C. MARSHALL DANN
Commissioner of Patents